（12） United States Patent
Mukawa et al.

(10) Patent No.: US 11,171,539 B2
(45) Date of Patent: Nov. 9, 2021

(54) HOIST AND METHOD FOR MANUFACTURING HOIST

(71) Applicant: KITO CORPORATION, Yamanashi (JP)

(72) Inventors: Nobuyoshi Mukawa, Yamanashi (JP); Teruaki Hirota, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 0 days.

(21) Appl. No.: 16/317,962

(22) PCT Filed: Jul. 13, 2017

(86) PCT No.: PCT/JP2017/025572
§ 371 (c)(1),
(2) Date: Jan. 15, 2019

(87) PCT Pub. No.: WO2018/012594
PCT Pub. Date: Jan. 18, 2018

(65) Prior Publication Data
US 2019/0238027 A1 Aug. 1, 2019

(30) Foreign Application Priority Data
Jul. 15, 2016 (JP) .............................. JP2016-140175

(51) Int. Cl.
*H02K 7/102* (2006.01)
*F16D 55/04* (2006.01)
(Continued)

(52) U.S. Cl.
CPC .......... *H02K 7/1028* (2013.01); *F16D 55/04* (2013.01); *F16D 65/10* (2013.01); *F16D 69/02* (2013.01);
(Continued)

(58) Field of Classification Search
CPC ...... F16D 69/02; F16D 69/025; F16D 69/027; F16D 2200/006; F16D 2200/0069;
(Continued)

(56) References Cited

U.S. PATENT DOCUMENTS 2,401,256 A * 5/1946 Lear ..................... H02K 7/1025
188/180
3,028,512 A * 4/1962 Sorchy ................. H02K 7/1028
310/77
(Continued)

FOREIGN PATENT DOCUMENTS

CN 201605111 U 10/2010
CN 201704013 U 1/2011
(Continued)

OTHER PUBLICATIONS

SIPO First Office Action corresponding to CN Application No. 201780038988.2; dated Oct. 8, 2019.
(Continued)

*Primary Examiner* — Thomas J Williams
(74) *Attorney, Agent, or Firm* — Cantor Colburn LLP

(57) ABSTRACT

A hoist is provided with a braking mechanism comprising: a motor cover that is provided with an outer wall which is provided such that the inner diameter of an inner peripheral portion thereof increases with proximity to one side in the axial direction from the other side; a drum member that is provided with an outer peripheral portion which is located radially inward of the inner peripheral portion of the outer wall and which faces the inner peripheral portion; and a brake shoe that is mounted on the outer peripheral portion. The inner peripheral portion is provided with a blast-treated portion which is blast-treated upon impact by media which contains large amounts of sharp edges among media which
(Continued)

contains large amounts of sharp edges and media which contains large amounts of non-sharp edges.

7 Claims, 4 Drawing Sheets

(51) Int. Cl.
    *F16D 65/10*     (2006.01)
    *F16D 69/02*     (2006.01)
    *H02K 7/12*     (2006.01)
    *F16D 55/00*     (2006.01)
    *F16D 69/00*     (2006.01)

(52) U.S. Cl.
    CPC ............. *H02K 7/102* (2013.01); *H02K 7/125* (2013.01); *F16D 2055/0075* (2013.01); *F16D 2069/004* (2013.01); *F16D 2250/0038* (2013.01)

(58) Field of Classification Search
    CPC .... F16D 2250/0038; F16D 2250/0046; H02K 7/102; H02K 7/1021; H02K 7/1023; H02K 7/1028; H02K 7/12; H02K 7/125
    USPC ........ 188/156, 157, 158, 161, 162, 166, 171
    See application file for complete search history.

(56) References Cited

U.S. PATENT DOCUMENTS

| | | | | |
|---|---|---|---|---|
| 3,032,667 A | * | 5/1962 | Sorchy ................. | H02K 7/1028 310/77 |
| 3,068,975 A | * | 12/1962 | Theuer ................... | H02K 7/102 192/223.3 |
| 3,626,220 A | * | 12/1971 | Niculescu .............. | H02K 7/125 310/77 |
| 3,683,217 A | * | 8/1972 | Agalakov ............ | H02K 7/1028 310/77 |
| 4,277,734 A | * | 7/1981 | Uhrner ................... | H02K 7/125 318/758 |
| 4,877,987 A | * | 10/1989 | Flaig ...................... | H02K 7/125 310/209 |
| 5,407,035 A | * | 4/1995 | Cole ........................ | C23C 4/18 188/218 XL |
| 6,971,490 B2 | * | 12/2005 | Lin ......................... | F16D 69/00 188/218 R |
| 10,132,374 B2 | | 11/2018 | Terauchi et al. | |
| 2003/0097754 A1 | * | 5/2003 | Yamane .................. | B05D 7/14 29/898 |
| 2004/0238317 A1 | * | 12/2004 | Acosta ................... | H02K 7/102 192/223 |
| 2008/0308365 A1 | * | 12/2008 | Foge ..................... | F16B 39/225 188/251 A |
| 2013/0161137 A1 | * | 6/2013 | Huschenhoefer ..... | F16D 65/127 188/218 XL |
| 2016/0281810 A1 | | 9/2016 | Terauchi et al. | |
| 2018/0131250 A1 | * | 5/2018 | Jewell ..................... | F16D 11/14 |

FOREIGN PATENT DOCUMENTS

| | | | | |
|---|---|---|---|---|
| CN | 102290916 A | | 12/2011 | |
| CN | 103715823 A | | 4/2014 | |
| CN | 105637247 A | | 6/2016 | |
| FR | 2419249 A1 | * | 10/1979 | ............... B66D 3/20 |
| JP | 58123347 A | * | 7/1983 | ............. H02K 7/125 |
| JP | 58201556 A | | 11/1983 | |
| JP | 61094533 A | * | 5/1986 | ............. H02K 7/102 |
| JP | 02107836 A | | 4/1990 | |
| JP | 237296 Y | | 10/1990 | |
| JP | 2653772 B | | 5/1997 | |
| JP | 2015122904 A | | 7/2015 | |

OTHER PUBLICATIONS

International Search Report corresponding to Application No. PCT/JP2017/025572; dated Sep. 5, 2017.
TW Office Action corresponding to Application No. TW106123618 dated Dec. 19, 2019 with English Translation.

* cited by examiner

HOIST AND METHOD FOR MANUFACTURING HOIST

CROSS REFERENCE TO RELATED APPLICATION

This is a U.S. national stage of application No. PCT/JP2017/025572, filed on Jul. 13, 2017. Priority under 35 U.S.C. § 119(a) and 35 U.S.C. § 365(b) is claimed from Japanese Patent Applications No. 2016-140175 filed on Jul. 15, 2016, the disclosures of which are both also incorporated herein by reference.

TECHNICAL FIELD

A hoist and a method for manufacturing a hoist.

BACKGROUND ART

For example, for an electric rope hoist and a chain block, motors giving a driving force for hoisting and a driving force for traveling have been used, and as such motors, a brake-attached motor (hereinafter, to be referred to as a brake motor) has been used broadly.

As such a brake motor, there is a configuration disclosed in Patent Literature 1, for example. In Patent Literature 1, a cone-shaped brake plate (12) is provided, this brake plate (12) is provided with a plate body (14), and on the outer periphery side of the plate body (14), a brake shoe (15) with a large friction coefficient is mounted. Further, on the inner surface of a conical portion of a rear frame (16), a brake receiver (18) is provided and the brake shoe (15) is provided on the brake receiver (18) so as to come into pressure-contact therewith.

CITATION LIST

Patent Literature

{PTL 1} JP 58-201556

Technical Problem

By the way, in the case where a brake motor is assembled in the configuration disclosed in PTL1, a state where the brake shoe (15) abuts on the brake receiver (18) only partially is made. That is, when manufacturing each rear frame (16) provided with the brake shoe (15) and the brake receiver (18), in the initial state where the brake motor is assembled, a contact area between the brake shoe (15) and the brake receiver (18) decreases, leading to deficiency of brake torque due to the existence of manufacturing tolerance.

Thus, in order to obtain desired brake torque, a pre-conditioning interim operation is performed for only a predetermined time in the current brake motor, to thereby increase the contact area between the brake shoe (15) and the brake receiver (18). However, there is a problem that such a pre-conditioning interim operation is performed, and thereby the manufacturing cost increases by the cost of the operation.

In consideration of the above-described circumstances, a hoist capable of increasing brake torque even in the case where a contact area is small and a method for manufacturing a hoist are provided.

Solution to Problem

According to a first aspect, in order to solve the above-described problems, there is provided a brake motor including a brake mechanism that supplies a braking force to rotations of a motor shaft, in which the brake motor includes: a motor cover including an outer wall portion that is provided so as to increase the inner diameter of an inner peripheral portion thereof with proximity to one side in the axial direction from the other side; a drum member including an outer peripheral portion that is located radially inward relative to the inner peripheral portion of the outer wall portion and faces the inner peripheral portion; a brake shoe that is attached on the outer peripheral portion, and a blast-treated portion blast-treated upon impact by media that contain large amounts of sharp edges among media that contain large amounts of sharp edges and media that contain large amounts of non-sharp edges is provided on the inner peripheral portion.

Further, in another aspect, in the above-described invention, the media are preferred to be glass beads.

Further, in another aspect, in the above-described invention, projecting portions that project relative to the other portion of the blast-treated portion and pointed ends each having a pointed shape on the tip side of the projecting portions are preferably provided in the blast-treated portion.

Further, in another aspect, in the above-described, preferably, in an assemble initial state where the drum member provided with the brake shoe and the motor cover are assembled, the brake shoe is brought into an outer contact state of coming into contact with the inner peripheral portion on one side in the axial direction with a large inner diameter rather than on the other side in the axial direction with a small inner diameter, and the blast-treated portion is formed so as to make the degree of the blast treatment smaller on the other side in the axial direction with a small inner diameter than on one side in the axial direction with a large inner diameter, the one side causing the outer contact state.

Further, in another aspect, in the above-described, preferably, a spiral-shaped spiral groove that is recessed relative to the other portion of the inner peripheral portion and travels in the axial direction along the inner peripheral portion is provided in the inner peripheral portion.

Further, according to a second aspect, there is provided a method for manufacturing a brake motor including a brake mechanism that supplies a braking force to rotations of a motor shaft, the method including: a motor cover forming step that forms a motor cover including an outer wall portion that is provided so as to increase the inner diameter of an inner peripheral portion thereof with proximity to one side in the axial direction from the other side and configuring the brake mechanism; a blast treatment step that blast-treats the inner peripheral portion upon impact by media that contain large amounts of sharp edges among media that contain large amounts of sharp edges and media that contain large amounts of non-sharp edges; a drum member forming step that forms a drum member including an outer peripheral portion that is located radially inward relative to the inner peripheral portion of the outer wall portion and faces the inner peripheral portion and configuring the brake mechanism; a brake shoe attaching step that attaches a brake shoe configuring the brake mechanism on the outer peripheral portion; and an assembling step that assembles the motor cover and the drum member in a state where the brake shoe faces the inner peripheral portion.

Advantageous Effects

Accordingly, it is possible to provide a hoist that is capable of increasing brake torque even in the case where a contact area is small and a method for manufacturing a hoist.

DESCRIPTION OF EMBODIMENTS

Figure 1:
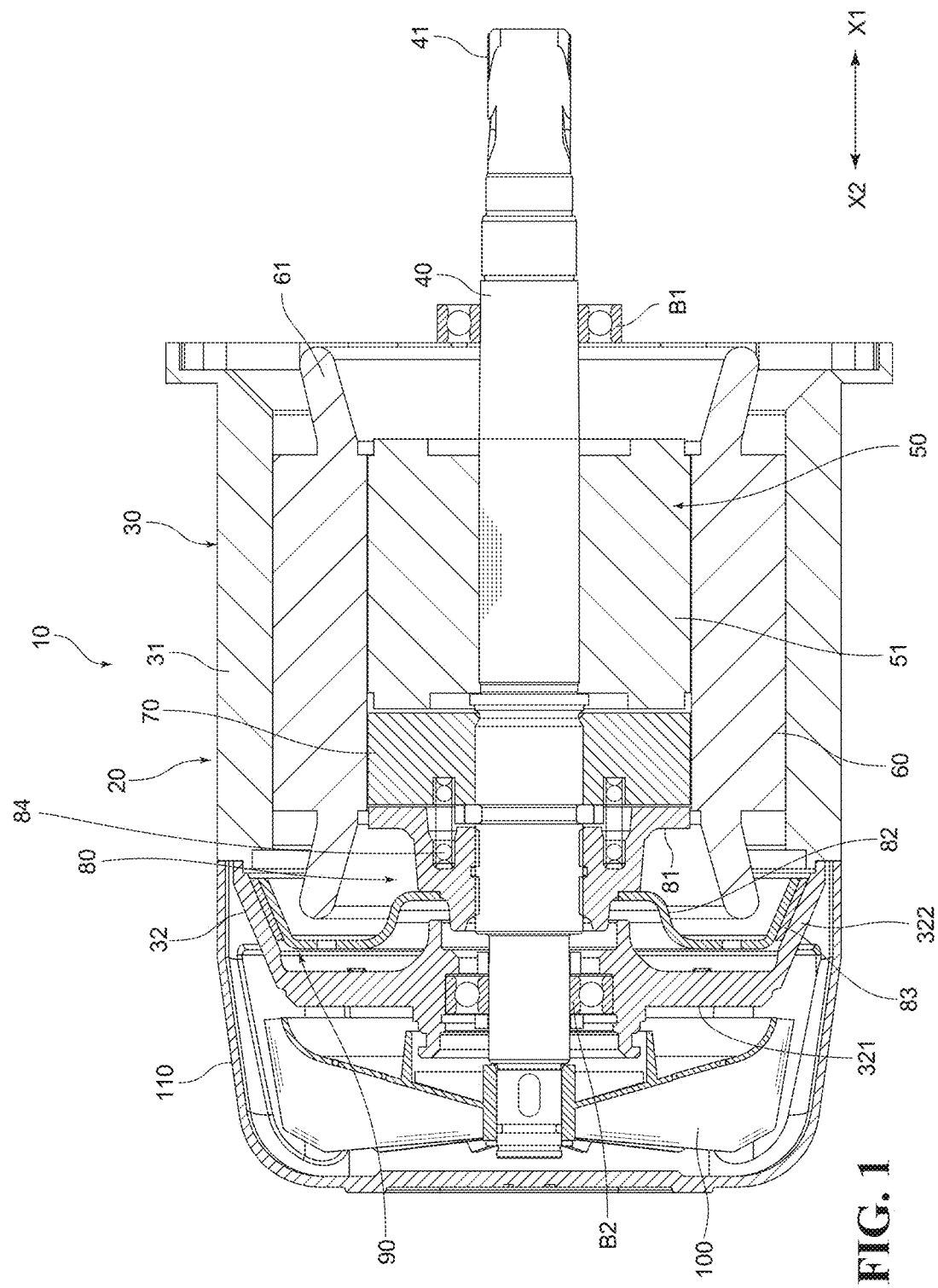
FIG. 1 is a sectional side view illustrating the entire configuration of a brake motor according to one embodiment of the present invention.

Hereinafter, there will be explained a brake motor 10 according to one embodiment of the present invention based on the drawings. Incidentally, in the following explanation, the X direction indicates the drawing direction of a motor shaft 50, the X1 side indicates the side where a shaft bearing B1 is located (right side in FIG. 1), and the X2 side indicates the side where a shaft bearing B2 is located (left side in FIG. 1).

<1. Regarding a Configuration of the Brake Motor 10>

FIG. 1 is a sectional side view illustrating the entire configuration of the brake motor 10. Incidentally, the brake motor 10 to be explained below is a motor that supplies a driving force to rotate a rope drum of a rope hoist, for example. However, the brake motor 10 may be one that supplies a driving force to travel the rope hoist, or may also be one that supplies a driving force to hoist and lower a load chain of a chain block.

As illustrated in FIG. 1, the brake motor 10 includes: a motor main body 20; a fan 100 that configures a cooling mechanism; and a fan cover 110 that also configures the cooling mechanism as the main components. Among them, the motor main body 20 is an induction motor in this embodiment. This motor main body 20 includes: a motor housing 30; the motor shaft 40; a rotor 50; a stator 60; a pull rotor 70; and a brake drum body 80 as the main components.

The motor housing 30 is provided with a motor frame 31 and a motor cover 32. The motor frame 31 is a cylindrical member made of metal. Incidentally, on the outer periphery side of the motor frame 31, not-illustrated fins or the like are provided in order to improve heat dissipation performance. Further, the motor cover 32 is mounted so as to be incapable of rotating in a state of fitting on the motor frame 31. The motor cover 32 is mounted so as to close the inside of the motor housing 30 from the other side (X2 side).

This motor cover 32 is provided with a cover bottom portion 321 and an outer wall portion 322. Between them, the cover bottom portion 321 is a portion to be the bottom of the motor cover 32, and in the center side in a radial direction of the cover bottom portion 321, a center hole 323 (see FIG. 2) is provided. Incidentally, it is configured so that the shaft bearing B2 can be mounted in this center hole 323. Thereby, the other side of the motor shaft 40 (X2 side) is supported so as to easily rotate. On the other hand, one side of the motor shaft 40 (X1 side) is supported by the shaft bearing B1 illustrated in FIG. 1 so as to easily rotate.

Further, the motor cover 32 is a member configuring a brake mechanism 90. In the configuration illustrated in FIG. 1, the outer wall portion 322 is provided so that the inner diameter thereof increases gradually with proximity to one side (X1 side) from the other side (X2 side) in the axial direction (X direction). That is, the distance from an inner peripheral portion 322a of the outer wall portion 322 to the center axis of the motor shaft 40 (namely, the radius of the inner peripheral portion 322a) increases gradually with proximity to one side (X1 side) from the other side (X2 side). This enables a later-described brake shoe 83 to well abut on the inner peripheral portion 322a. Incidentally, the outer periphery side of the outer wall portion 322 may be provided in a tapered shape, but does not need to have a tapered shape.

Further, the motor shaft 40 is located at the center in the radial direction of the motor housing 30 and extends along the axial direction (X direction). The other side of this motor shaft 40 (X2 side) protrudes to the outside of the motor housing 30 through the center hole 323. Further, one side of the motor shaft 40 (X1 side) also protrudes to one side (X1 side) from the motor housing 30. Incidentally, on one end side of the motor shaft 40 (an end of the X1 side), an integral pinion gear portion 41 is provided. However, a configuration in which in place of the pinion gear portion 41, a separate pinion gear is mounted on the motor shaft 40, or another configuration to transmit a rotational force may be applied.

Further, on the outer periphery side of the motor shaft 40, the motor rotor 50 is mounted. The motor rotor 50 is a cage-type rotor, and is provided with end rings whose illustrations are omitted at both ends in the axial direction, and a plurality of conductor bars are provided so as to couple these end rings. Further, the conductor bars are each covered with a magnetic material part, and the magnetic material part is formed of what is called a soft magnetic material such as a silicon steel sheet or the like as a material, and the material is iron, an alloy containing metals such as cobalt and nickel, or the like.

Further, on an inner wall of the motor frame 31, the stator 60 around which a coil 61 is wound is mounted. The stator 60 is provided in a cylindrical shape and is arranged in a state where the inner periphery side thereof faces the motor rotor 50. For example, a three-phase alternating current is supplied to such coils 61 and the stator 60 generates a rotating magnetic field, and thereby a rotating force is supplied to the motor rotor 50.

Further, the pull rotor 70 is mounted on the motor shaft 40 by, for example, spline coupling or the like. The pull rotor 70 is arranged to face the stator 60 in the radial direction. Further, the pull rotor 70 is arranged to face a movable core 81 of the brake drum body 80 in the axial direction (X direction). The above-described pull rotor 70 has a function to deflect the direction of a magnetic field in the rotating magnetic field by a plurality of not-illustrated iron pieces so as to be able to attract the movable core 81. Thus, a magnetic flux from the stator 60 flows to the pull rotor 70, thereby enabling the pull rotor 70 to attract the movable core 81 of the brake drum body 80. Thereby, the later-described brake shoe 83 leaves from the inner peripheral portion 322a, leading to cancellation of a brake state.

Figure 2:
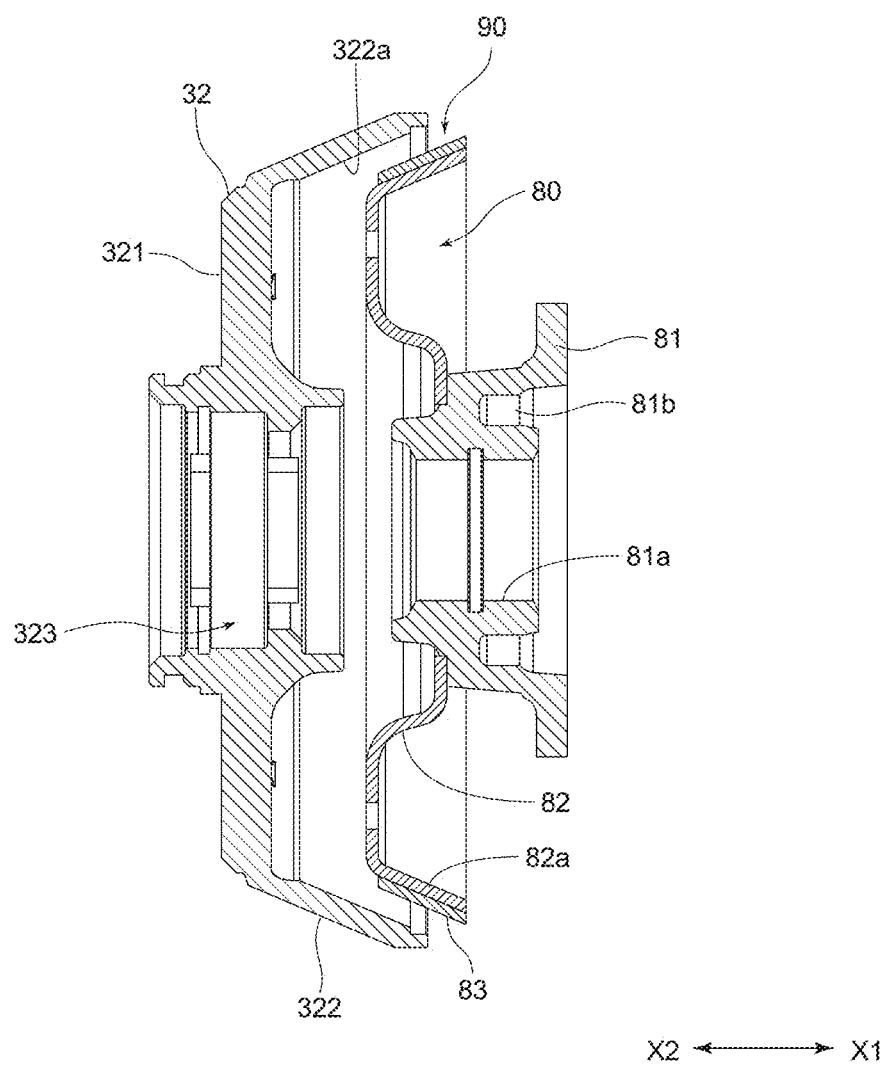
FIG. 2 is a cross-sectional view illustrating configurations of a brake drum body and a motor cover of the brake motor illustrated in FIG. 1, and is a view illustrating a state where the brake drum body has been slightly separated to one side from the motor cover.

As illustrated in FIG. 1, on the other side of the pull rotor 70 (X2 side), the brake drum body 80 is arranged. The brake drum body 80 is also a member configuring the brake mechanism 90. FIG. 2 is a cross-sectional view illustrating the configurations of the brake drum body 80 and the motor cover 32, and is a view illustrating a state where the brake drum body 80 has been slightly separated to one side (X1 side) from the motor cover 32. As illustrated in FIG. 1 and FIG. 2, the brake drum body 80 includes: the movable core 81; a drum member 82; and the brake shoe 83. The movable core 81 is formed of the same magnetic material as or a magnetic material different from that of the motor rotor 50, which is, for example, a carbon steel. Further, the movable core 81 is arranged to face the pull rotor 70 in the axial direction (X direction). Thus, when the magnetic flux flows from the stator 60 to the pull rotor 70, the movable core 81 is pulled to the pull rotor 70 by magnetic force of the magnetic flux.

Here, the movable core 81 is mounted on the motor shaft 40 in a slidable state. Further, a center hole 81*a* of the movable core 81 and the motor shaft 40 are spline-coupled, for example. Thus, the movable core 81 rotates integrally with the motor shaft 40 in a state of sliding in the axial direction (X direction). Further, in the movable core 81, a recessed-shaped spring holding portion 81*b* that is recessed from an end surface on one end side (end surface on the X1 side) to the other end side (X2 side) is provided, and into this spring holding portion 81*b*, the other end side of a brake spring 84 (X2 side) is inserted. Therefore, as the material near the center hole 81*a*, a medium carbon steel is set due to placing emphasis on mechanical strength and as the material of an attraction portion 81*c* facing the pull rotor 70, a low-carbon steel is set due to placing emphasis on magnetic attraction force desirably.

Further, the drum member 82 is fixed to the motor cover 32 side of the movable core 81 (X2 side). This drum member 82 is provided in a bowl shape, and on an outer peripheral portion 82*a* thereof, the brake shoe 83 is attached. Incidentally, the outer peripheral portion 82*a* is inclined toward the axial direction (X direction) so that the inner diameter and the outer diameter increase with proximity to one side (X1 side) from the other side (X2 side) similarly to the outer wall portion 322.

Further, the brake shoe 83 is provided in a ring shape, and is attached on the outer peripheral portion 82*a* of the drum member 82 by screw fasteners, adhesive application, or the like, for example. This brake shoe 83 is also a member configuring the brake mechanism 90. This brake shoe 83 is formed of a member with friction coefficient higher than that of the drum member 82 and the other members. Thus, in the case where the brake shoe 83 is pressed against the inner peripheral portion 322*a* of the outer wall portion 322 of the motor cover 32, a large frictional force is generated to supply a braking force to the rotations of a rotation part including the drum member 82. Incidentally, as the material of the brake shoe 83, for example, a resin-molded friction material can be cited, but another material may be used. Further, in the case where the friction coefficients of the drum member 82 and the other members are sufficiently high, the friction coefficient of the brake shoe 83 may be equal to or equal to less than the friction coefficients of the drum member 82 and the other members.

Further, the brake spring 84 has one end side thereof (X1 side) abut on an end surface on the other end side of the pull rotor 70 (end surface on the X2 side) and has the other end side thereof (X2 side) abut on a bottom surface of the above-described spring holding portion 81*b*. This brake spring 84 supplies a biasing force that presses the brake shoe 83 against the inner peripheral portion 322*a* of the outer wall portion 322.

Further, on the other end side of the motor shaft 40, the fan 100 for cooling the brake motor 10 is mounted. The fan 100 rotates integrally with the motor shaft 40 to generate an airflow, thereby being capable of discharging heat of the brake motor 10. Further, on the other side of the brake motor 10 (X2 side), the fan cover 110 is mounted so as to cover the fan 100. A plurality of air vents whose illustrations are omitted are provided in the fan cover 110, thereby making it possible to introduce the air thereinto from the outside of the fan cover 110 and lead the air out toward the motor cover 32 and the motor frame 31.

<2. Regarding a Blast-Treated Portion>

Subsequently, there will be explained a blast-treated portion 322*b*. In this embodiment, the blast-treated portion 322*b* is provided on the inner peripheral portion 322*a* of the outer wall portion 322. This blast-treated portion 322*b* is a shot-blasted portion, and the blast-treated portion 322*b* is in a state where the friction coefficient increases as compared to the case before performing a shot-blast treatment.

Further, in this embodiment, media having sharp edges (projection material) are blown onto the inner peripheral portion 322*a*, and thereby the blast-treated portion 322*b* is formed. That is, as the media to be used for the blast treatment, not the edge-removed ones, but the ones having sharp edges are used. As such media, new alumina (aluminum oxide) and glass beads are cited.

Incidentally, as the new alumina, there is a lot of new alumina having sharp edges, but as used alumina, there is a lot of used alumina from which sharp edges have been removed. Further, the glass beads often crack when colliding with such an object as the inner peripheral portion 322*a*. Then, the glass beads crack, and thereby sharp edges appear. Incidentally, out of the cracked glass beads, the glass beads that have become too fine are sucked by a dust suction device existing in a shot blasting device for performing shot blasting. Thus, the blast treatment is performed by regularly adding glass beads being the media.

Figure 3:
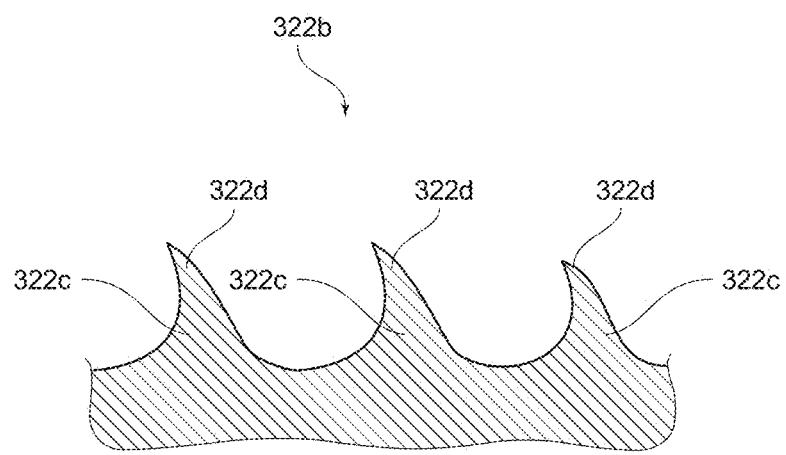
FIG. 3 is a cross-sectional view illustrating a state of an enlarged image of a blast-treated portion to be formed when a blast treatment is performed using media having sharp edges in this embodiment.

There is illustrated an enlarged state of the inner peripheral portion 322*a* in the case where a blast treatment has been performed using such media having sharp edges in FIG. 3. FIG. 3 is a cross-sectional view illustrating an enlarged state of an image of the blast-treated portion 322*b* to be formed when the blast treatment is performed using media having sharp edges. As illustrated in FIG. 3, on the tip side of projecting portions 322*c* of the blast-treated portion 322*b*, pointed ends 322*d* such that a person feels catches when touching them by his/her finger exist. Further, this blast-treated portion 322*b* is in a state where fine irregularities are seen.

Figure 4:
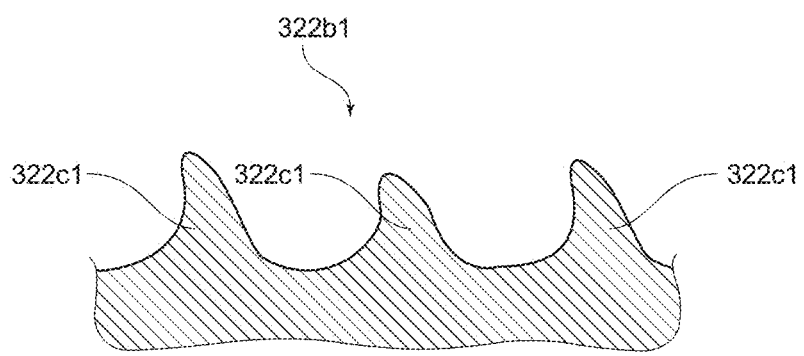
FIG. 4 is a cross-sectional view illustrating a state of an enlarged blast-treated portion to be formed when a blast treatment is performed using used alumina.

On the other hand, there is illustrated an enlarged state of the inner peripheral portion 322*a* in the case where a blast treatment has been performed using used lumina in FIG. 4. FIG. 4 is a cross-sectional view illustrating an enlarged state of a blast-treated portion 322*b*1 to be formed when the blast treatment is performed using used alumina. As illustrated in FIG. 4, in the case where the blast treatment has been performed using the used alumina, a state where the pointed ends 322*d* are not easily formed on the tip side of projecting portions 322*c*1 is made. That is, in the case where the blast treatment has been performed using the used alumina, a person does not feel catches even when touching the blast-treated portion 322*b*1 by his/her finger.

Here, in Table 1, there are listed measurement results obtained by measuring a brake pulling force and brake torque in the case where blast-treated portions are formed using various media. Incidentally, in experiment results, a reference value of the brake torque is set to 42.42 Nm and a reference value ratio to the reference value is also listed. Further, in this experiment, a handle having an entire length of 480 mm is mounted on the motor shaft 40 and on the end of the handle, a measuring device is attached. As the measuring device, a MODEL 9550A being a simple-type digital push-pull gauge manufactured by Aikoh Engineering Co., Ltd. was used. In the case of conducting the measurement, the end of the handle was pulled in a direction perpendicular to the handle and the numerical value (brake pulling force) was found when the motor shaft 40 started to rotate. Then, based on this brake pulling force, the brake torque was calculated.

experiment is conducted in the case where four vertical grooves (grooves running in the axial direction (X direction)) were provided in the inner peripheral portion 322a. Further, in Comparative example 10, the experiment is conducted in the case where the blast treatment was performed using used alumina.

Further, in Example 1, there is described the case where the blast treatment was performed using new alumina. Further, in Example 2, the experiment is conducted in the case where the blast treatment was performed using new glass beads. Further, in Examples 3, 4, the experiment is conducted in the case where the blast treatment was performed using used glass beads.

From the above experiment results, the case of Examples 1 to 4 results in that the reference value ratio exceeds 100%.

TABLE 1

| | VERIFICATION ITEM | BRAKE PULLING FORCE [kg] | BRAKE TORQUE [N · m] | REFERENCE VALUE RATIO [42.42 N · m] |
|---|---|---|---|---|
| CONVENTIONAL EXAMPLE 1 | EXISTING PRODUCT | 7.12 | 33.48 | 79% |
| COMPARATIVE EXAMPLE 1 | BRAKE SHOE VERTICAL GROOVE | NO CHANGE | NO CHANGE | NO CHANGE |
| COMPARATIVE EXAMPLE 2 | BRAKE SHOE VERTICAL AND TRANSVERSE GROOVES | NO CHANGE | NO CHANGE | NO CHANGE |
| COMPARATIVE EXAMPLE 3 | SPIRAL GROOVE (NUMBER OF SPIRALS: 1) | 8.23 | 38.73 | 91% |
| COMPARATIVE EXAMPLE 4 | SPIRAL GROOVE (NUMBER OF SPIRALS: 1) | 8.11 | 38.13 | 90% |
| COMPARATIVE EXAMPLE 5 | SPIRAL GROOVE (NUMBER OF SPIRALS: 2) | 8.33 | 39.17 | 92% |
| COMPARATIVE EXAMPLE 6 | SPIRAL GROOVE (NUMBER OF SPIRALS: 2) | 7.80 | 36.68 | 86% |
| COMPARATIVE EXAMPLE 7 | SPIRAL GROOVE (NUMBER OFSPIRALS: 3) | 8.31 | 39.11 | 92% |
| COMPARATIVE EXAMPLE 8 | SPIRAL GROOVE (NUMBER OF SPIRALS: 3) | 8.17 | 38.42 | 91% |
| COMPARATIVE EXAMPLE 9 | FOUR VERTICAL GROOVES | 7.64 | 35.94 | 85% |
| EXAMPLE 1 | SHOT BLAST (NEW ALUMINA) | 9.50 | 44.67 | 105% |
| COMPARATIVE EXAMPLE 10 | SHOT BLAST (USED ALUMINA) | 7.30 | 34.34 | 81% |
| EXAMPLE 2 | SHOT BLAST (NEW GLASS BEADS) | 9.24 | 43.46 | 102% |
| EXAMPLE 3 | SHOT BLAST (USED GLASS BEADS) | 9.86 | 46.37 | 109% |
| EXAMPLE 4 | SHOT BLAST (USED GLASS BEADS) | 9.80 | 46.11 | 109% |

In Table 1 above, the experiment is conducted also on an existing product being a current product (set as Conventional example 1), and at the same time, the experiment is conducted also in the case where a vertical groove was formed not in the motor cover 32 but in the brake shoe 83 side (set as Comparative example 1) and the case where a vertical groove and a transverse groove were formed in the brake shoe 83 side (set as Comparative example 2). In Comparative examples 1, 2, the brake pulling force, the brake torque, and the reference value ratio are the same as those of the existing product (conventional product 1). Further, the experiment is conducted also in the case where a spiral groove was formed in the inner peripheral portion 322a. In Comparative examples 3, 4, the experiment is conducted in the case where a spiral groove has been formed one time (for one lap) in the inner peripheral portion 322a. Further, in Comparative examples 5, 6, the experiment is conducted in the case where two spiral grooves (for two laps) have been formed in the inner peripheral portion 322a.

Further, in Comparative examples 7, 8, the experiment is conducted in the case where three spiral grooves have been formed three times (for three laps) in the inner peripheral portion 322a. Further, in Comparative example 9, the On the other hand, the case of each of Comparative examples 1 to 10 is in a state where the reference value ratio does not exceed 100%.

From the experiment results, there is derived the fact that the brake torque exceeds the reference value in such a case as Examples 1 to 4 where the blast treatment was performed using media having sharp edges to form the blast-treated portion 322b.

Incidentally, the degree of the blast treatment in the blast-treated portion 322b is set to be in a uniform state totally. However, when the blast-treated portion 322b is formed so that the degree of the blast treatment becomes smaller in a portion with a small inner diameter than in a portion with a large inner diameter, it is possible to shorten the time for the blast treatment, resulting in that a further cost reduction is enabled. That is, the blast-treated portion 322b is formed so that the degree of the blast treatment becomes smaller on the other side in the axial direction (X direction) with a small inner diameter (X2 side) than on one side in the axial direction (X direction) with a large inner diameter (X1 side). Further, the degree of the blast treatment in the blast-treated portion 322b may be set to be in a uniform state totally or in a non-uniform state totally, and the degree of the blast treatment may be made smaller on one side in the axial direction (X direction) with a large inner diameter (X1 side) than on the other side in the axial direction (X direction) with a small inner diameter (X2 side).

<3. Regarding a Method for Manufacturing the Brake Motor>

In the case where the brake motor 10 with the above-described configuration is manufactured, in a motor cover forming step, the motor cover 32 having the outer wall portion 322 is formed. This motor cover 32 can be formed by casting, presswork, cutting, and so on, for example. Then, after the motor cover 32 is formed in the motor cover forming step, the shot blast treatment is performed onto the inner peripheral portion 322a of the outer wall portion 322 in a blast treatment step. At this time, like the above-described new alumina and glass beads, among media that contain large amounts of sharp edges and media that contain large amounts of non-sharp edges, media that contain large amounts of sharp edges are used upon impact.

Further, separately from the motor cover forming step, in a drum member forming step, the drum member 82 is formed. Also in this drum member forming step, the drum member 82 can be formed by presswork, cutting, casting, and so on, for example. Further, after the drum member forming step, in a brake shoe mounting step, the brake shoe 83 is attached on the outer peripheral portion 82a of the drum member 82. After the brake shoe 83 is attached, a sliding surface is cut, but the cutting may be omitted.

Incidentally, regarding the inner peripheral portion 322a of the outer wall portion 322, the tolerance to the reference angle that is inclined toward the axial direction (X direction) is, for example, −0.25 degrees to 0 degrees. On the other hand, regarding the brake shoe 83, the tolerance to the above-described reference angle is, for example, 0 degrees to +0.25 degrees. Thus, immediately after the brake motor 10 is assembled (in the initial state), the brake shoe 83 is brought into a state of coming into contact with the inner peripheral portion 322a on one side in the axial direction (X direction) with a large inner diameter (X1 side) (outer contact state). On the other hand, as described above, the blast-treated portion 322b is formed so that the degree of the blast treatment becomes smaller in the portion with a small inner diameter than in the portion with a large inner diameter. Therefore, immediately after the brake motor 10 is assembled (in the initial state), the brake shoe 83 is brought into a state of coming into contact with the portion with a large degree of the blast treatment and the contact portion of the brake shoe 83 is scraped off (catches are removed), and thereby it is possible to increase the contact area by use. On the other hand, the contact area increases, and thereby the brake torque tends to increase, but the degree of blast in the portion where the contact area increases later is made small, and thus the increase in friction coefficient by blast is minimum or hardly affected, and the increase in brake torque does not increase more than necessary. Further, by the use, the blast-treated surface is polished to be smooth and brake force and abrasion stabilize.

By going through the above steps and at the same time, going through various steps other than the above, the brake motor 10 is completed.

<4. Regarding an Operation of the Brake Motor>

Next, there will be explained an operation of the brake motor 10. In a state where energization to the coil 61 of the stator 60 is cut off, the coil is not excited, and thus the motor rotor 50 stops rotating. At this time, the brake spring 84 biases the movable core 81 (brake drum body 80) toward the other side (X2 side), and by the biasing force, the brake shoe 83 presses the inner peripheral portion 322a. Thereby, a large frictional force acts between the brake shoe 83 and the inner peripheral portion 322a. Thereby, a stopping state of the motor rotor 50 is maintained.

When the above-described coil 61 is energized in this state and the stator 60 generates a rotating magnetic field by switching of the energization to the coil 61, force to rotate the motor rotor 50 is supplied. Thereby, the motor rotor 50 tries to start rotating. At this time, the magnetic flux from the stator 60 travels not only toward the motor rotor 50 but also toward the pull rotor 70 and the movable core 81. Thereby, the movable core 81 (brake drum body 80) is attracted to the pull rotor 70 side (X1 side) while resisting the biasing force of the brake spring 84. Then, the brake shoe 83 leaves from the inner peripheral portion 322a. Thereby, the brake state by the brake mechanism 90 is cancelled.

Here, manufacturing tolerance exists in each of the drum member 82, the brake shoe 83, and the motor cover 32. Further, when assembling the brake motor 10, such an assembling error as above or the like also exists. Thus, it is normal that at the initial stage of manufacturing the brake motor 10, the brake shoe 83 is in contact with the inner peripheral portion 322a only partially. Then, in anticipation of these tolerances, dimensions are set so that the brake shoe 83 can abut on the inner peripheral portion 322a on the side with a large diameter of the inner peripheral portion 322a (one side; X1 side) normally. This is because the brake torque is large in the case where the brake shoe 83 comes into contact with the inner peripheral portion 322a on the side with a large diameter (one side; X1 side) as a result of a comparison between the case where the brake shoe 83 comes into contact with the inner peripheral portion 322a on the side with a large diameter (one side; X1 side) and the case where the brake shoe 83 comes into contact with the inner peripheral portion 322a on the side with a small diameter (the other side; X2 side).

Figure 5:
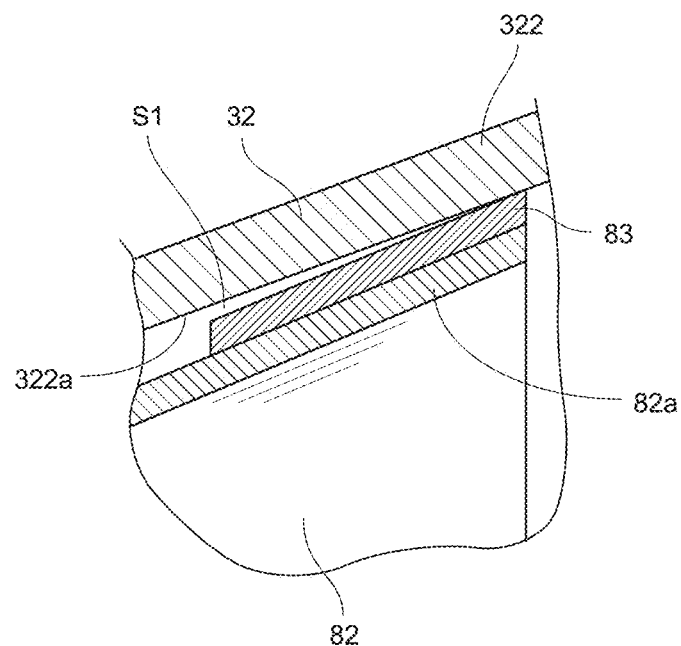
FIG. 5 is a schematic view schematically illustrating a state where a brake shoe and an inner peripheral portion are in contact with each other only partially in this embodiment.
Figure 6:
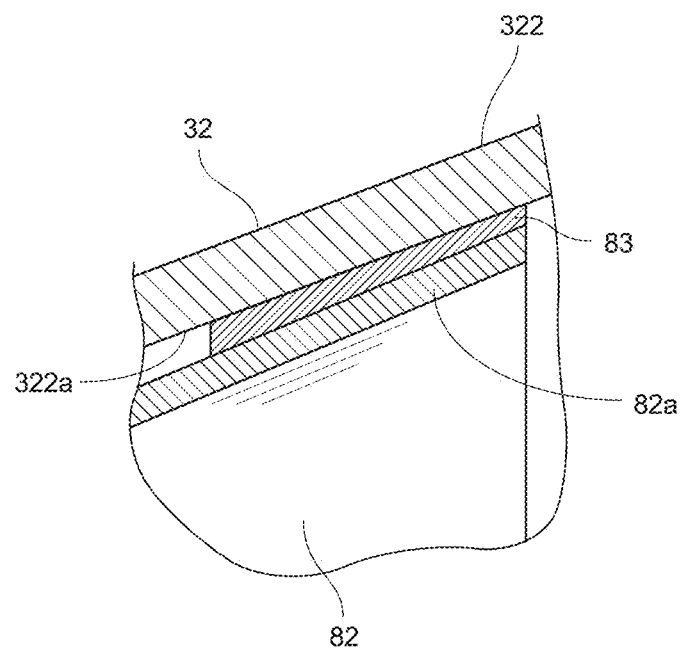
FIG. 6 is a schematic view schematically illustrating a state where a contact area between the brake shoe and the inner peripheral portion has increased by a pre-conditioning interim operation of the brake motor.

FIG. 5 is a schematic view schematically illustrating a state where the brake shoe 83 and the inner peripheral portion 322a are in contact with each other only partially. FIG. 6 is a schematic view schematically illustrating a state where the contact area between the brake shoe 83 and the inner peripheral portion 322a has increased by performing a pre-conditioning interim operation.

As illustrated in FIG. 5, in the initial state after the brake motor 10 is assembled, the brake shoe 83 is in a state of abutting on the inner peripheral portion 322a only partially. Therefore, a state where a gap Si also exists between the inner peripheral portion 322a and the brake shoe 83 is made. Thus, in the initial state after the brake motor 10 is assembled, a state where the contact area between the brake shoe 83 and the inner peripheral portion 322a becomes insufficient and the brake torque becomes insufficient is made. Thus, in a current brake motor, after the brake motor is assembled, the pre-conditioning interim operation is performed for a predetermined time. Thereby, as illustrated in FIG. 6, the contact area between the brake shoe 83 and the inner peripheral portion 322a is designed to increase.

In contrast to this, in this embodiment, the blast-treated portion 322b is provided on the inner peripheral portion 322a. Moreover, the blast-treated portion 322b is blast-treated by media having sharp edges. Thus, as illustrated in FIG. 3, a state where a large number of the pointed ends 322d exist on the projecting portions 322c of the blast-treated portion 322b is made. This pointed end 322d is such that a person feels a catch when touching it by his/her finger.

Thus, the blast-treated portion 322b enables the frictional force to increase between the blast-treated portion 322b and the brake shoe 83.

The existence of such a blast-treated portion 322b makes it possible to increase the brake torque even in the initial state after the brake motor 10 is assembled, and thereby it is possible to make the pre-conditioning interim operation unnecessary.

Incidentally, when the brake motor 10 in the initial state is used, sliding occurs between the brake shoe 83 and the blast-treated portion 322b by the operation of the brake mechanism 90, so that the pointed ends 322d will disappear in the future. However, when sliding occurs so as to make the pointed ends 322d disappear, the contact area increases due to abrasion between the brake shoe 83 and the blast-treated portion 322b, and thus it is possible to increase the brake torque. Therefore, the blast-treated portion 322b serves as an intermediary until the contact area between the brake shoe 83 and the blast-treated portion 322b increases.

<5. Regarding Effects>

According to the brake motor 10 having the above configuration and the method for manufacturing the brake motor 10, the brake mechanism 90 includes the motor cover 32 including the outer wall portion 322 that is provided so that the inner diameter of the inner peripheral portion 322a increases with proximity to one side (X1 side) in the axial direction (X direction) from the other side (X2 side). Further, the brake motor 10 includes: the drum member 82 including the outer peripheral portion 82a that is located radially inward relative to the inner peripheral portion 322a of the outer wall portion 322 and faces the inner peripheral portion 322a; and further the brake shoe 83 attached on the outer peripheral portion 82a. Then, on the inner peripheral portion 322a of the outer wall portion 322, the blast-treated portion 322b is provided, which is blast-treated upon impact by media that contain large amounts of sharp edges among media that contain large amounts of sharp edges and media that contain large amounts of non-sharp edges.

As above, the blast-treated portion 322b exists, thereby making it possible to increase the brake torque even in the case where the contact area between the blast-treated portion 322b and the brake shoe 83 is small as in the initial state after the brake motor 10 is assembled. Therefore, the pre-conditioning interim operation of the brake motor 10 becomes unnecessary. Thus, it is possible to reduce the manufacturing cost by the amount that the pre-conditioning interim operation process becomes unnecessary.

Further, in this embodiment, for the media for forming the blast-treated portion 322b, glass beads are used. Therefore, when colliding with the inner peripheral portion 322a in the shot blast treatment, the glass beads crack. Thereby, it is possible to prevent the state where edges of the glass beads are rounded, resulting in that the sharp edges appear continuously. Then, the sharp edges collide with the inner peripheral portion 322a, thereby making it possible to form the blast-treated portion 322b such that the brake torque increases.

Further, even after sharp edges of the new alumina are gone, the new alumina is circulated without being smashed into fine pieces like glass and collected and discharged by a dust collector. Thus, as the brake motor 10 is used, the effect of the blast treatment decreases gradually, resulting in that on the tip side of the projecting portions 322c, the pointed ends 322d such that a person feels catches when touching them by his/her finger are not easily formed gradually. In order to recover such an effect of the blast treatment, replacement of the alumina being the media is required, but it is difficult to distinguish between one having sharp edges and one not having sharp edges, which is not economical. On the other hand, in the case where the glass beads are used as the media, after colliding with the inner peripheral portion 322a, the glass beads crack, to thereby create new sharp edges. Further, in the case where the glass beads crack into fine pieces in excess of prescription, leading to the decrease in the effect of the blast treatment, the fine pieces are collected by a dust collector to be discharged to the outside. Thus, a worker only needs to add the glass beads by the amount of the decrease in the glass beads being the media, resulting in that management of the blast treatment step is facilitated.

Further, in this embodiment, in the blast-treated portion 322b, the projecting portions 322c projecting relative to the other portion of the blast-treated portion 322b and the pointed ends 322d each having a pointed shape on the tip side of the projecting portions 322c are provided. That is, as illustrated in FIG. 5, the pointed ends 322d are pointed portions such that a person feels catches when touching them by his/her finger. Therefore, as compared to such a state where the pointed ends 322d do not exist as illustrated in FIG. 6, the pointed ends 322d catch on the brake shoe 83 and dig into the brake shoe 83, thereby making it possible to increase the frictional force between the inner peripheral portion 322a and the brake shoe 83, and thereby it is possible to increase the brake torque.

Further, in this embodiment, in the assemble initial state where the drum member 82 provided with the brake shoe 83 and the motor cover 32 are assembled, the brake shoe 83 is in an outer contact state of coming into contact with the inner peripheral portion 322a of the motor cover 32 on one side in the axial direction (X direction) with a large inner diameter (X1 side) rather than on the other side in the axial direction (X direction) with a small inner diameter (X2 side). Further, the blast-treated portion 322b is formed so that the degree of the blast treatment becomes smaller on the other side in the axial direction (X direction) with a small inner diameter (X2 side) than on one side in the axial direction (X direction) with a large inner diameter (X1 side) that causes an outer contact state. Therefore, even in the case where the contact area between the blast-treated portion 322b and the brake shoe 83 is small as in the initial state after the brake motor 10 is assembled, it becomes possible to increase the brake torque, resulting in that the pre-conditioning interim operation can be made unnecessary. Further, it is possible to reduce the cost required for the blast treatment rather than to uniformize the blast treatment. Further, it is also possible to control the abrasion of the brake shoe 83 caused by the projecting portions 322c and the pointed ends 322d formed by the blast treatment. That is, the degree of the blast treatment is made large in a portion where it is necessary to increase the amount of initial abrasion, and in a portion where the amount of initial abrasion is made small, the degree of the blast treatment is made small with the degree or gradually, thereby making it possible to suppress fluctuations of the brake torque, reduce the manufacturing cost, and suppress the undue abrasion of the brake shoe.

Further, in this embodiment, in the blast treatment step, the inner peripheral portion 322a of the outer wall portion 322 is blast-treated upon impact by media that contain large amounts of sharp edges among media that contain large amounts of sharp edges and media that contain large amounts of non-sharp edges. Therefore, in the case of forming the blast-treated portion 322b on the inner peripheral portion 322a, the inner peripheral portion 322a is scraped off by the sharp edges of the media, thereby causing a state where a person feels catches when touching them by his/her finger, resulting in that it becomes possible to increase the frictional force between the inner peripheral portion 322a and the brake shoe 83. Thereby, even in the case where the contact area between the blast-treated portion 322b and the brake shoe 83 is small as in the initial state after the brake motor 10 is assembled, it becomes possible to increase the brake torque. Therefore, the pre-conditioning interim operation of the brake motor 10 becomes unnecessary. Thus, it is possible to reduce the manufacturing cost by the amount that the pre-conditioning interim operation process becomes unnecessary.

<6. Modification Example>

The embodiment of the present invention has been explained above, and the present invention can be variously modified in addition to this. Hereinafter, they will be explained.

In the above-described embodiment, the case of using the new alumina and the glass beads as the media is explained. However, the media are not limited to these. Other media having sharp edges like new silica sand, for example, may be used.

Further, in the above-described embodiment, on the inner peripheral portion 322a, the blast-treated portion 322b is only formed. However, on the inner peripheral portion 322a, together with the blast-treated portion 322b, another worked portion may exist. For example, there may be applied a configuration in which a spiral-shaped spiral groove that is recessed relative to the other portion of the inner peripheral portion 322a and runs in the axial direction (X direction) along the inner peripheral portion 322a is provided in the inner peripheral portion 322a. Such a spiral groove has an effect of improving the brake torque by about 10% as compared to the existing product (Conventional example 1) even in a state where the blast-treated portion 322b does not exist and the spiral groove exists independently as described in Comparative examples 3 to 8. Thus, the blast-treated portion 322b and the spiral groove are combined, thereby making it possible to further increase the brake torque.

Further, together with the blast-treated portion 322b, a plurality of such vertical grooves as described in Comparative example 9 may be formed. Even in a state where the plural vertical grooves exist independently, there is an effect of slightly improving the brake torque as compared to the existing product (Conventional example 1). Thus, the blast-treated portion 322b and the plural vertical grooves are combined, thereby making it possible to further increase the brake torque.

Further, in the above-described embodiment, the brake shoe 83 is attached on the drum member 82 side. However, there may be employed a configuration in which the brake shoe 83 is attached on the outer wall portion 322 side of the motor cover 32.

Further, in the above-described embodiment, the configuration in which the motor main body 20 includes the pull rotor 70 is employed. However, there may be employed a configuration in which the motor main body doe not include the pull rotor.

Further, in the above-described embodiment, a three-phase alternating current induction motor is set as the motor main body 20. However, the motor main body 20 is not limited to the three-phase alternating current induction motor, and another motor may be used. As another motor, for example, synchronous motors such as a single-phase alternating current induction motor, an IPM (Interior Permanent Magnet) motor, and a SPM (Surface Permanent Magnet) motor, a stepping motor, a DC motor, and so on are cited.

Further, in the above-described embodiment, the brake motor 10 is set to rotate a rope drum and hoist and lower a load chain (namely, set for a hoist), but the brake motor 10 may be used for apparatuses other than the hoist.

The invention claimed is:

1. A hoist comprising a brake motor comprising a brake mechanism that supplies a braking force to rotations of a motor shaft, wherein
the brake motor includes:
    a pull rotor attached to the motor shaft and arranged to face a stator in the radial direction of the motor shaft;
    a movable core that is arranged to face the pull rotor and to be attracted by the pull rotor when a magnetic flux from the stator flows to the pull rotor;
    a motor cover including an outer wall portion that is provided so as to increase an inner diameter of an inner peripheral portion thereof with proximity to one side in an axial direction of the motor shaft from other side;
    a drum member that is fixed to the motor cover side of the movable core, which is the other side, when the one side is the pull rotor side in the axial direction, and including an outer peripheral portion that is located radially inward relative to the inner peripheral portion of the outer wall portion and faces the inner peripheral portion;
    a brake shoe that is attached on the outer peripheral portion, and
wherein
    a tolerance of a surface angle of the inner peripheral portion regarding to a reference angle that is inclined toward the axial direction is −0.25 degrees or more and less than 0 degrees,
    a tolerance of a surface angle of the brake shoe regarding to the reference angle is more than 0 degrees and less than or equal to +0.25 degrees,
    a combination of an inclination angle of the inner peripheral portion within the tolerance range on the inner peripheral portion side and an inclination angle of the brake shoe within the tolerance range on the brake shoe side is set so that, in an assemble initial state where the drum member provided with the brake shoe and the motor cover are assembled, the brake shoe is in an outer radial side contact state in which the brake shoe contacts with the inner peripheral portion on outer diameter side rather than on an inner diameter side, and
    projecting portions provided on the inner peripheral portion of the motor cover,
    wherein a degree of the projecting portions is smaller in a portion of the motor cover with a small inner diameter than in a portion of the motor cover with a large inner diameter.

2. The hoist according to claim 1, wherein
the projecting portions include pointed ends each having a pointed shape on a tip side of the projecting portions.

3. The hoist according to claim 1, wherein
the degree of the projecting portions is smaller on the other side in the axial direction with the small inner diameter than on one side in the axial direction with the large inner diameter, the one side causing the outer radial side contact state.

4. The hoist motor according to claim 1, wherein
a spiral-shaped spiral groove that is recessed relative to other portion of the inner peripheral portion and travels in the axial direction along the inner peripheral portion is provided in the inner peripheral portion.

5. The hoist according to claim 2, wherein
a spiral-shaped spiral groove that is recessed relative to other portion of the inner peripheral portion and travels in the axial direction along the inner peripheral portion is provided in the inner peripheral portion.

6. The hoist according to claim 3, wherein
a spiral-shaped spiral groove that is recessed relative to other portion of the inner peripheral portion and travels in the axial direction along the inner peripheral portion is provided in the inner peripheral portion.

7. A method for manufacturing a hoist comprising a brake motor including
a brake mechanism that supplies a braking force to rotations of a motor shaft, wherein:
the brake motor includes:
a pull rotor attached to the motor shaft and arranged to face a stator in the radial direction of the motor shaft;
a movable core that is arranged to face the pull rotor and to be attracted by the pull rotor when a magnetic flux from the stator flows to the pull rotor;
a motor cover including an outer wall portion that is provided so as to increase an inner diameter of an inner peripheral portion thereof with proximity to one side in an axial direction of the motor shaft from other side;
a drum member that is fixed to the motor cover side of the movable core, and including an outer peripheral portion that is located radially inward relative to the inner peripheral portion of the outer wall portion and faces the inner peripheral portion;
a brake shoe that is attached on the outer peripheral portion, and
the method comprising:
forming the motor cover to have a tolerance of a surface angle of the inner peripheral portion regarding to a reference angle that is inclined toward the axial direction, the tolerance being −0.25 degrees or more and less than 0 degrees, and configuring the brake mechanism;
scraping-off the inner peripheral portion upon impact by media that contain large amounts of sharp edges among media, wherein projecting portions are formed so that a degree of the projecting portions becomes smaller in a portion with a small inner diameter of the motor cover than in a portion with a large inner diameter of the motor cover;
forming the drum member configuring the brake mechanism;
attaching the brake shoe configuring the brake mechanism on the outer peripheral portion so that a tolerance of a surface angle of the brake shoe regarding to the reference angle is more than 0 degrees and less than or equal to +0.25 degrees; and
assembling the motor cover and the drum member in a state where the brake shoe faces the inner peripheral portion,
wherein
a combination of an inclination angle of the inner peripheral portion within the tolerance range on the inner peripheral portion side and an inclination angle of the brake shoe within the tolerance range on the brake shoe side is set so that, in an assemble initial state where the drum member provided with the brake shoe and the motor cover are assembled, the brake shoe is brought into an outer radial side contact state in which the brake shoe contacts with the inner peripheral portion on outer diameter side rather than on inner diameter side.

* * * * *